United States Patent [19]

Lavanant et al.

[11] 3,905,030

[45] Sept. 9, 1975

[54] DIGITAL SOURCE OF PERIODIC SIGNALS

[75] Inventors: Pierre Lavanant, Lannion; Jean-Baptiste Jacob, Saint-Quay-Perros, both of France

[73] Assignees: Societe Lannionnaise d'Electronique; Compagnie Industrielle des Telecommunications Cit-Alcatel, both of Paris, France

[22] Filed: July 19, 1971

[21] Appl. No.: 163,607

[30] Foreign Application Priority Data

July 17, 1970 France .............................. 70.26552

[52] U.S. Cl.. 340/347 DA; 179/18 BA; 179/84 VF; 328/27

[51] Int. Cl.$^2$. H03K 13/00; H04L 3/00; H04M 1/45

[58] Field of Search ............ 179/90 K, 84 VF, 90 B, 179/90 BD, 18 BA, 1 SA, 15.55 R; 331/142, 110; 328/27, 14; 340/347 DA

[56] References Cited

UNITED STATES PATENTS

| | | | |
|---|---|---|---|
| 3,206,554 | 9/1965 | Kandel | 179/18 BA |
| 3,301,967 | 1/1967 | Plyer | 179/90 BD |
| 3,334,190 | 8/1967 | Jenkins | 179/18 BA |
| 3,398,241 | 8/1968 | Lee | 179/1 SA |
| 3,497,625 | 2/1970 | Hileman et al. | 340/347 DA |
| 3,532,821 | 10/1970 | Nakata | 179/1 SA |
| 3,575,555 | 4/1971 | Schanne | 179/1 SA |
| 3,588,353 | 6/1971 | Martin | 179/1 SA |
| 3,601,552 | 8/1971 | Barnaby | 179/90 B |
| 3,647,973 | 3/1972 | James | 179/84 VF |
| 3,665,113 | 5/1972 | Blake | 179/90 B |
| 3,697,703 | 10/1972 | Clark | 179/1 SA |
| 3,772,681 | 11/1973 | Skingle | 328/27 |

*Primary Examiner*—Thomas A. Robinson
*Attorney, Agent, or Firm*—Craig & Antonelli

[57] ABSTRACT

A generator according to the invention comprises essentially a numerical table in which values of the signal over a period are stored; consulting of the table is effected along a step $k$; the frequency of the signal to be generated, the frequency of consultation $F$ and the number $N$ of values of the signal in the period are related to $k$ by the equation: $k = Nf/F$ ($k$=$N/2$). If the signal is sinusoidal, the table can contain $N/4$ values, namely from 0 to $\pi/2$, and an address selector enables the sign of each quarter period of the signal to be taken into consideration.

14 Claims, 7 Drawing Figures

INVENTORS
PIERRE LAVANANT and
JEAN-BAPTISTE JACOB
BY Craig, Antonelli & Hill
ATTORNEYS

| N° | α° | Sin α |
|---|---|---|
| 0 | 0 | 0,000 |
| 1 | 0,7 | 0,012 |
| 2 | 1,4 | 0,024 |
| 3 | 2,1 | 0,035 |
| 4 | 2,8 | 0,050 |
| ⋮ | ⋮ | ⋮ |
| 123 | 86,5 | 0,998 |
| 124 | 87,2 | 0,998 |
| ⋮ | ⋮ | ⋮ |
| 127 | 89,3 | 0,999 |
| 128 | 90,0 | 1 |
| 129 | 90,7 | 0,999 |
| ⋮ | ⋮ | ⋮ |
| 132 | 92,8 | 0,998 |

INVENTORS

PIERRE LAVANANT and

JEAN-BAPTISTE JACOB

BY Craig, Antonelli & Hill

ATTORNEYS

INVENTORS
PIERRE LAVANANT and
JEAN-BAPTISTE JACOB
BY Craig, Antonelli & Hill
ATTORNEYS INVENTORS
PIERRE LAVANANT and
JEAN-BAPTISTE JACOB
BY
Craig, Antonelli & Hill
ATTORNEYS

DIGITAL SOURCE OF PERIODIC SIGNALS

The present invention concerns a digital source of periodic signals and is more particularly, though not exclusively, concerned with a source of sinusoidal signals.

Digital signal sources have already been described, and generally consist of a digital oscillator associated with a stabilization network including digital filters, a digital calculator periodically carrying out operations on the oscillator and stabilization network signals. The oscillation frequency has been determined by values stored in a memory. Such signal sources require a calculator and a stabilization network of some complexity.

In accordance with the present invention, a digital source of periodic signals comprises a store for a set of values defining the signal value at predetermined points in a signal period, circuitry for sampling the store content at least twice in each signal period, and output circuitry comprising a digital-to-analogue converter and a filter.

The invention will now be described in more detail, by way of examples only, and with reference to the accompanying diagrammatic drawings in which.

Figure 1:
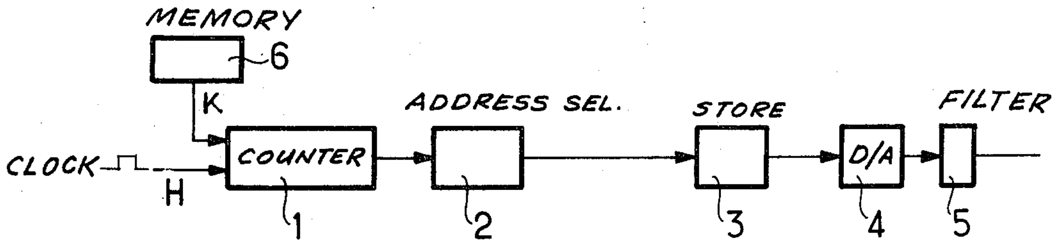
FIG. 1 is an overall block diagram of a digital signal source.

Referring to FIG. 1, the digital signal source includes a counter 1 whose output is connected to an address selector 2, the output of which is applied to a store 3. Output circuitry of the source comprises a digital-to-analogue converter 4 connected to receive signals from the store, and a filter 5 connected to receive the converter output. A memory 6 is connected to one input of the counter 1, which also receives clock pulses at a connection H.

The memory 6 holds one or more increment values k, one or more of which may be selected by appropriate means.

At successive clock pulses, a selected value of $k$ is aggregated in the counter 1, and the aggregate value or the whole portion thereof when fractional provides an address code corresponding to one of a number of signal values held in the store 3. In the case of a sinusoidal signal, the signal values are sine values over one period of the signal, which applied to the digital-to-analogue converter 4 and filter 5 provide at the source output a sinusoidal waveform.

These operations will be described in more detail with reference to the remaining figures of the drawings.

According to the Shannon theorem, a signal to be reconstituted must be sampled at a frequency at least twice that of the signal itself. Thus, if the digital source of FIG. 1 is to provide at its output a sinusoidal signal of frequency $f$, the content of store 3 must be sampled at a frequency $F$ which is equal to or greater than $2f$. In other words, the content of store 3 must be sampled at least twice in each signal period. If the store 3 holds $N$ values characterizing one signal period, the sampling increment $k$ must be less than $N/2$.

If the sampling frequency is $F$ and every one of the $N$ values held in store 3 is consulted in each signal period, the output frequency $f$ would be $F/N$. If every $k$ th value is consulted, each signal period is defined by $N/K$ values and the output frequency $f$ is $kF/N$. It should be noted that the case where every value is consulted corresponds to the case $k = 1$.

Thus, if $F$ and $N$ are known, the appropriate value of $k$ for a given frequency $f$ is obtained from the relation $k - NF/F$. Thus, if $F$ must be at least $2f$, the maximal value of $k$ is $k \doteq N/2$, as already shown.

$k$ can be integral or fractional. The counter 1 aggregates successive values of $k$ until the whole portion of the aggregate is equal to $N$, corresponding to sampling of the entire signal period. Once the aggregate value exceeds $N$, the counter 1 indicates only the aggregate value modulo $N$, that is to say, the difference between the aggregate value of $k$ and $N$.

If $k$ is integral the sinusoidal waveform obtained is as accurate as the table of signal values held in store 3. If $k$ is fractional the use of only the whole portions of the aggregated $k$ value introduces a noise level corresponding to a sampling noise. Each particular application will require consideration as to whether this noise level is acceptable or not. Where it is not acceptable, it will be necessary to increase the number $N$ of values held in the store 3.

The signal is increasingly well-defined as the number of signal values characterizing each signal period increases, this simplifying the problems of filtering the output of converter 4 in the case of a sinusoidal signal. For given value of the frequency $f$ and a given value of $N$, the number of points characterizing each signal period increases as $k$ decreases, and thus as the frequency $F$ is increased.

Figure 2:
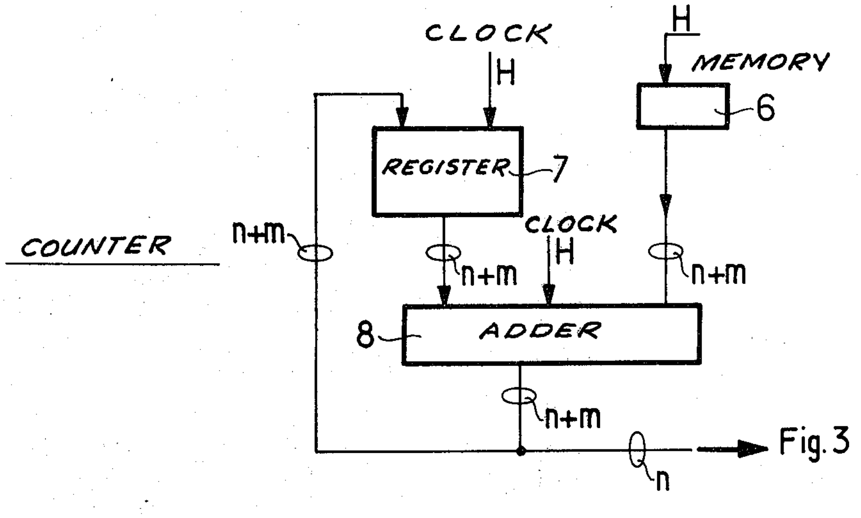
FIG. 2 is a block diagram of an increment counter of the source.

FIG. 2 shows the increment counter 1 in more detail. A register 7 is connected to receive the clock pulses at H. Its output is applied to one input of an adding circuit 8 which also receives clock pulses at H and signals from the $k$ memory 6. The output of the adder 8 constitutes that of the counter 1, and is connected to the address selector 2. The adder output is also connected to the input of the register 7.

The counter operates as follows:

Initially register 7 is empty. A first clock pulse applies the value $k$ to the adder 8, this value appearing at its output and being inserted in the register 7. On the next clock pulse, the adder 8 receives $k$ from memory 6 and also the $k$ held in register 7. At its output $2k$ is obtained, this value being applied to the register 7 to replace the previous value $k$. On the next clock pulse, the adder 8 receives $k$ from memory 6 and $2k$ from register 7, providing $3k$ at its output, this value being substituted for the $2k$ previously held in register 7. This cycle occurs on each clock pulse, so that the counter output consists of successive multiples of $k$.

$k$ may be fractional. If $N$ is equal to $2^n$, the memory 6 comprises $n$ binary elements with respective weights $2^{n-1}, 2^{n-2} \ldots 2^1, 2^0$, as well as $m$ binary elements of weights $2^{-1}, 2^{-2} \ldots 2^{-m}$. With these $n + m$ elements, any fractional value of $k$ within the prescribed limits (0 to $N/2$ exclusive) may be expressed.

Consequently, the connections between memory 6 and register 7 and the adder 8 are realized by lines containing $n + m$ wires. The output of adder 8 is connected to the input of register 7 over a further set of $n + m$ wires, but only the $n$ wires corresponding to the whole portion of the aggregate value $k$ are connected to the address selector 2. In this way, the selector 2 receives only the whole portion of the aggregate value, the fractional portion being applied only to the register 7 for generation of the next aggregate value.

Figure 3:
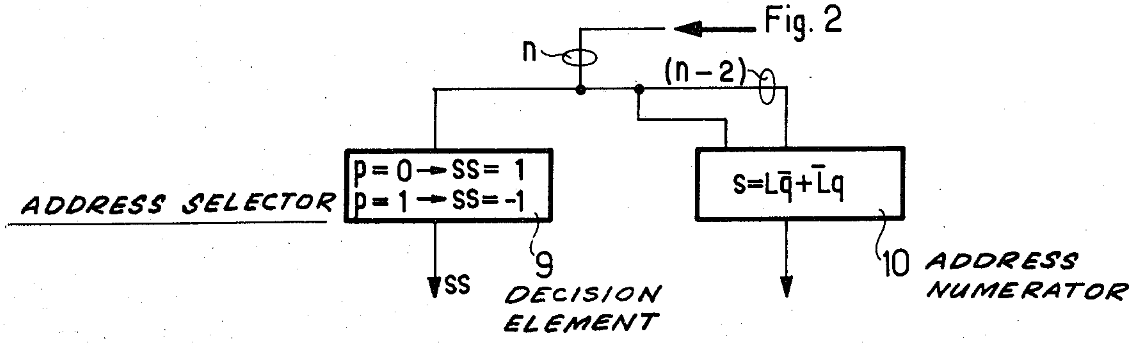
FIG. 3 is a block diagram of an address selector of the source.

FIG. 3 shows the address selector 2, in the case where the generator send out a sinusoidal signal, which comprises a decision element 9 and an address numerator 10. The highest weighted binary element is $2^{n-1}$, and the wire corresponding to this element is connected to the decision element 9. If the logic value carried by this wire is 1 ($p = 1$) the output $ss$ of decision element 9 is $-1$. If this wire carries no signal ($p = 0$) the output $ss = +1$.

$p = 0$ signifies that the instantaneous count of counter 1 is smaller than $2^{n-1}$.

The decision element 9 thus permits the number of stored signal values over one period for a sinusoidal signal to be reduced to a value $M = N/4$, in the form of $2^{n-2}$ sine values corresponding to the first quadrant 0 to $\pi/2$. This is possible since $\sin(\pi/2 + \alpha) = \sin(\pi/2 - \alpha)$, $\sin(\pi + \alpha) = -\sin\alpha$, and $\sin(3\pi/2 + \alpha) = -\sin(\pi/2 - \alpha)$.

When the instantaneous count in counter 1 is less than $2^{n-1}$, the corresponding angle is less than $\pi$ and the sine is positive. When the count is greater than $2^{n-1}$ but less than $2^n (p = 1)$ the corresponding angle is between $\pi$ and $2\pi$. Consequently the sine is negative.

When the instantaneous count is one less than $2^n$, the counter is returned to 0 and the sine takes a positive value. Thus, the decision element 9 provides at its output the signal $ss$ which is positive or negative depending on the sine value, in turn dependent on $k$ and its multiples.

The address numerator 10 receives the $(n-2)$ wires of weights $2^0, 2^1 \ldots 2^{n-3}$, providing a signal L applied to one part of the numerator, together with the wire of weight $2^{n-2}$ providing a signal $q$ applied to another part of the numerator. The numerator provides the sum $S = L\bar{q} + \bar{L}q$, where $\bar{L}$ and $\bar{q}$ are respectively the logical complements of $L$ and $q$.

Figures 4, 6:
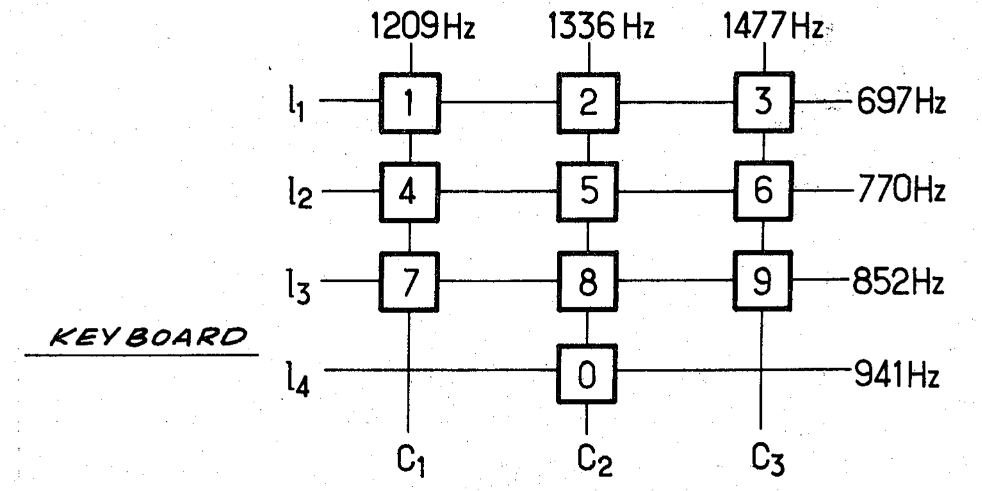
FIG. 4 shows the store content of the source.
FIG. 6 shows a keyboard associated with the circuitry of FIG. 5.

The following numerical example, given with reference to FIG. 4, will assist understanding of the invention:

If $N = 512 = 2^9$, there will be 128 sine values for the signal period 0 to $\pi/2$ held in the store 3. The corresponding value of $k$ is 0.7. FIG. 4 shows the values of sine $\alpha$ for the successive values of $\alpha$ 0, 0.7, 1.4, 2.1 . . . 89.3, 90, 90.7 . . . 92.8. These are indexed by address codes 0 to 132, as shown in FIG. 4, but the store 3 holds only the 128 values indexed 0 to 127.

The digital table containing the sine values of the function to be generated is provided in the memory or store 6, which can be, to great advantage, a dead memory, produced by integrated circuits. Such memories of the 1024 bit type, for example, providing 128 words of eight bits each, are commercially available and are generally identified by the designation ROM (read only memory).

If during a cycle of operations the adder 8 provides an address code corresponding to entry 132 in the table of FIG. 4, the address selector converts this to code 123, as follows:

Over the nine wires with weights $2^8, 2^7 \ldots 2^0$, the address selector receives the supposed address code 132. The elements of weights $2^7$ and $2^2$ take up logic 1, the remaining elements being at logic 0.

The decision element 9 receives a logic 0 over the wire of weight $2^8$, so that the output $ss$ takes the value +1. The numerator 10 receives a logic 1 over the wire of weights $2^7$, and a logic 1 over the wire of weight $2^2$. Thus, $L$ consists of the code 0000100 and $q$ of the code 1. The complements are $\bar{L}$ : 1111011 and $\bar{q}$ : 0.

Thus $S = L \times 0 + \bar{L} \times 1 = \bar{L}$;

thus $S = 123$, and the corresponding sine is that for the angle 86.5.

The address code 132 corresponds to sin 92.8, or sin (90 + 2.8) = sin (90 − 2.8) = sin 87.2, which corresponds to the address code 124 and not 123. Thus, a more precise result, in the case where $S = L$ is given by the relation $S = \bar{L} + 1$, which could be achieved by suitably adapting the circuitry of the numerator 10. Evidently, the circuit would be more complicated, and such a step would not be taken where this degree of inaccuracy were acceptable.

$q$ takes the successive values 0, 1, 0.1 . . . to define the successive values 0, 128, 256 . . . , whereas $L$ has always a value between 0 and 128. When $q = 0$ $S = L$ and the corresponding angle $\alpha$ defines a point in the first and third quadrants. When $q = 1$ $S = \bar{L}$ and the corresponding angle $\alpha$ defines a point in the second and fourth quadrants. Thus, for any address code less than 256, $p = 0$ and the sine is positive. For address codes between 256 and 512, the sine is negative.

Figure 5:
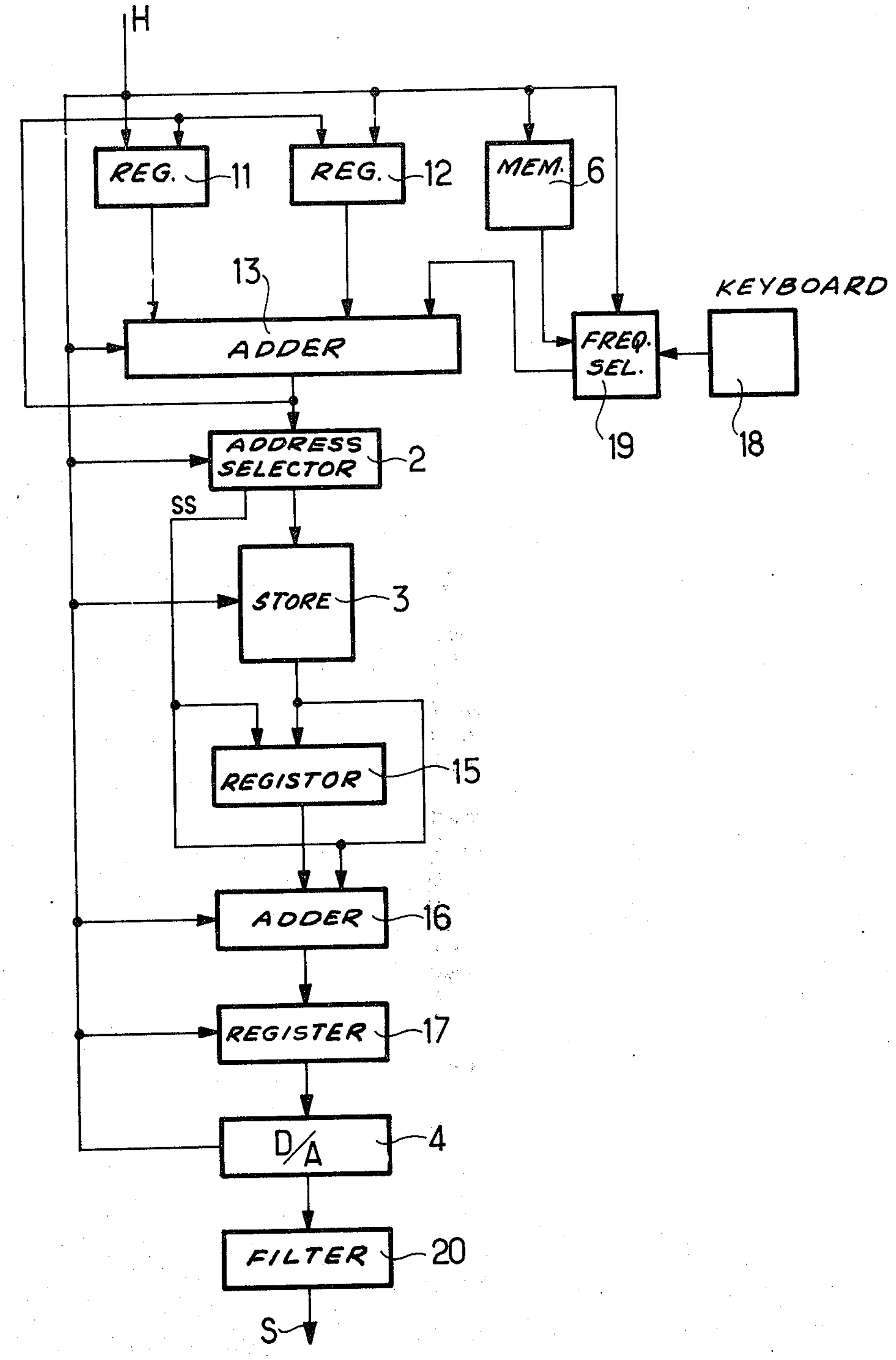
FIG. 5 is a block diagram of a multiple-frequency source.

FIG. 5 shows the digital frequency source integrated into a keyboard-operated telephone device sending out, at the output S, a two frequency signal composed of two sinusoidal signals each having a different frequency. The device includes a keyboard 18 operating a frequency selector 19. The increment values $k$ are held in a memory 6 connected to selector 19, whose output is connected to one input of an adder 13. Further inputs of adder 13 are connected to receive the outputs of registers 11 and 12 each having one input connected to receive clock pulses at H and another input connected to the output of adder 13.

The output of adder 13 is also connected to the input of an address selector 2 one output of which is connected to the store 3 of sine values. The output $ss$ of address selector 2 is connected to one input of of register 15 and to one input of an adder 16.

The output of store 3 is connected to a further input of register 15 and to a further input of adder 16, whose output is applied to a register 17 the output of which is in turn connected to output circuitry comprising a digital-to-analogue converter 4 and a filter 20. The memory 6, selector 19, selector 2, store 3, adder 16, register 17, and converter 4 are also connected to receive the clock pulses at H. The output S of the circuitry provides an output signal containing two frequencies. The circuitry operates as follows:

The clock pulse period $T$ is divided into two half periods $t_1$ and $t_2$. Each key of keyboard 18 when depressed controls the frequency selector 19 which selects a pair of frequencies by selecting two values of $k$, $k_1$ and $k_2$, from the memory 6. In the interval $t_1$, the adder 13 receives $k_1$ from memory 6 by the action of the selector 19 with the content of register 11. These are added and the resultant value replaces that initially in register 11. This value is also applied to the address selector 2, which causes the appropriate sine value to be read from store 3 and written into register 15.

In interval $t_2$, the selector 19 causes $k_2$ to be applied to adder 13 which adds it to the content of register 12. The sum replaces the initial value in register 12 and is also applied to the address selector 2, which causes the corresponding sine value to be read from store 3 which at the end of the interval $T$ is applied to the adder 16 with the value stored in register 15.

As well as receiving the sine value from store 3, register 15 is provided with the sign thereof from output *ss* of the selector 2. The sign of the sine is thus also available to adder 16, and at the end of the period T the output of adder 16 is transferred to register 17. This then passes through converter 4 and filter 20 to provide at the output S a signal with the two sinusoidal waveforms at frequencies $f_1$ and $f_2$ corresponding to the selected values $k_1$ and $k_2$.

FIG. 6 shows the keys of keyboard 18, indexed 0 to 9. The keys are arranged in four lines $L_1$ to $L_4$ and three columns $C_1$ to $C_3$. Each key lies on the intersection of a line and a column and each line and each column is identified by a corresponding frequency. Each key thus corresponds to a pair of frequencies selected by depressing that key. For example, the key indexed 8 selects frequencies of 852 HZ and 1336 HZ.

Figure 7:
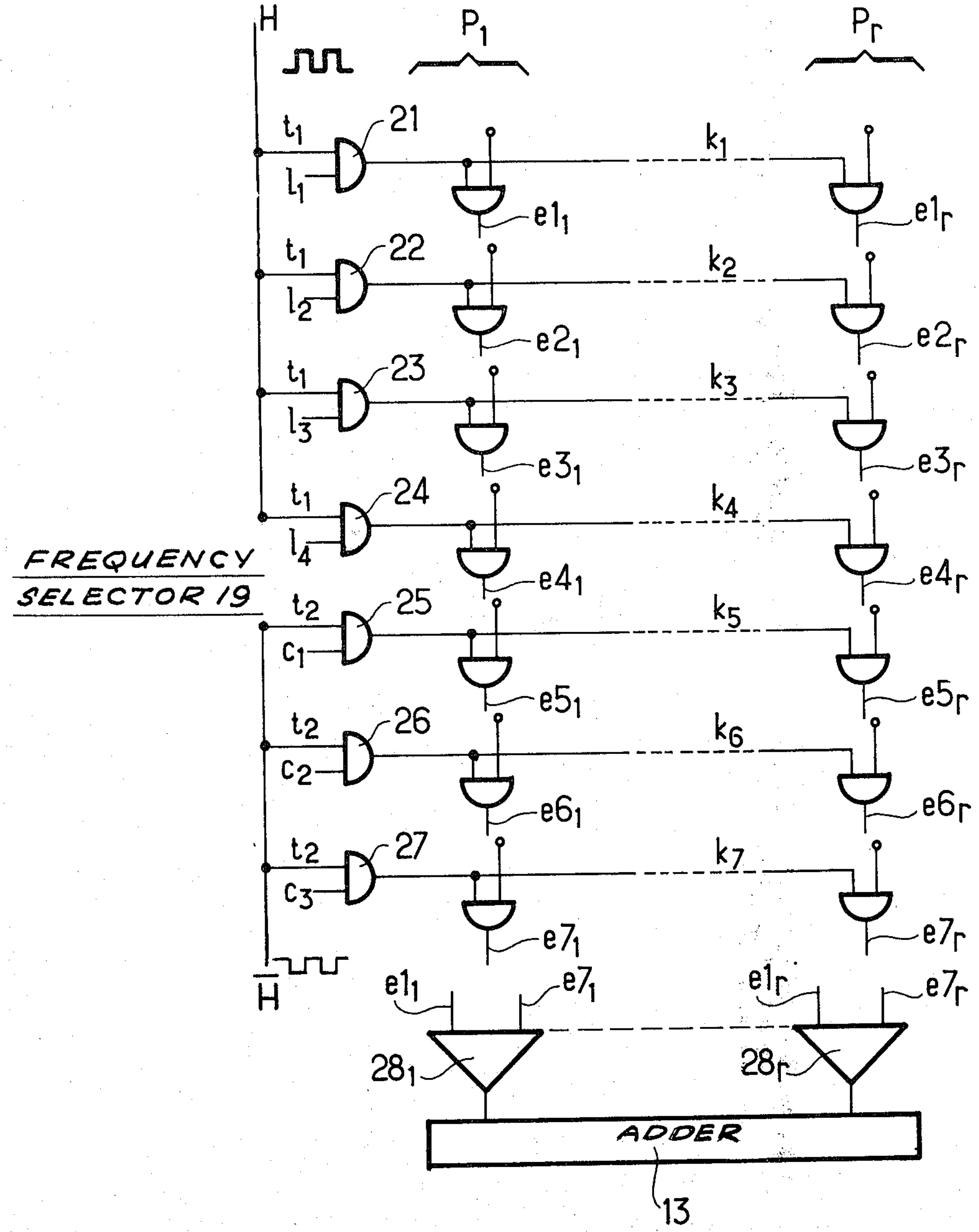
FIG. 7 shows a frequency selection network controlled by the keyboard of FIG. 6.

FIG. 7 shows the frequency selector 19 of FIG. 5 in more detail. The memory 6 holds seven values of $k$, $k_1$ to $k_7$, one corresponding to each line and each column and defining the corresponding frequency. The operation of any key in line $L_1$ applies a logic 1 to one input of an AND-gate 21. Any key in lines $L_2$ to $L_4$ when depressed applies a logic 1 to one input of a respective gate 22, 23 or 24. Three further gates 25, 26 and 27 are provided for columns $C_1$ to $C_3$.

Each of the AND-gates 21 to 27 is also connected to receive clock pulses at H, gates 21 to 24 receiving a logic 1 on second inputs during interval $t_1$, and gates 25 to 27 a logic 1 on their second inputs during interval $t_2$.

The output of gate 21 is connected to a first input of each of $r$ AND-gates whose outputs are indexed $el_1$ to $el_r$. A set of $r$ AND-gates is similarly connected to the output of each of gates 22 to 27, the outputs of the gates for gate 22 being indexed $e2_1$ to $e2_r$, those for gate 23 $e3_1$ to $e3_r$, and so on. The array of AND-gates makes up $r$ columns each of seven gates indicated by the references $P_1$ to $P_r$.

The gates corresponding to gate 21 correspond to the coefficient $k_1$. Those for gate 22 correspond to $k_2$, and so on. Each gate has a second input connected to receive one bit of the binary code corresponding to the appropriate value of $k$.

The outputs of the gates in each column P are connected to seven inputs of a respective OR-gate 28. For column $P_1$ the gate is $28_1$; that for column $P_r$ is $28_r$. The outputs of the $r$ AND-gates 28 are connected to an adder 13.

The selector operates as follows: If the key indexed 2 is depressed, a logic 1 is supplied to the first input of gates 21 and 26. In interval $t_1$, gate 21 receives a logic 1 in the form of a clock pulse, a logic 1 appearing at its output to open the $r$ gates corresponding to $k_1$. $k_1$ is thus transferred to the adder 13.

In interval $t_2$, a logic 1 appears at the output of gate 26 and $k_6$ is applied to the adder 13.

It will be appreciated that by appropriately extending the circuitry of FIG. 6, an output signal containing more than two frequencies may be obtained. It is also possible to generate more than one signal, each with its appropriate frequency, in which case the corresponding values of $k$ would not be combined after being read from the store.

What we claim is:

1. A digital source of periodic signals of different frequency comprising a store containing a set of values defining the signal value of a basic signal at predetermined points in the signal period, sampling means for sampling selected values of the basic signal in the store content at least twice in each signal period including digital means for forming an address code for each sampled value, and an output circuit connected to the output of said store comprising a digital-to-analogue converter and a filter in series.

2. A digital source of periodic signals of different frequency comprising a store containing a set of values defining the signal value of a basic signal at predetermined points in the signal period, sampling means for sampling selected values of the basic signal in the store content at least twice in each signal period, and an output circuit connected to the output of said store comprising a digital-to-analogue converter and a filter in series, in which said store holds $M$ values, where $M$ is equal to or a sub-multiple of $N$ which represents the number of values required to define the signal in each signal period, said sampling means including means for sampling said store at every $k$ th value where $k$ has a predetermined value between zero and $N/2$ exclusive, address counter means for aggregating successive values of $k$ so that its instantaneous count forms an address code for the currently sampled value.

3. A digital source as claimed in claim 2, in which $k$ is fractional and each value address code is formed by the whole portion of the corresponding instantaneous count of the address counter, and further including an address selector connected between said sampling means and said store for providing this whole portion of the count.

4. A digital source as claimed in claim 3, in which each value address is formed by the aggregated value of $k$ modulo $M$.

5. A digital source as claimed in claim 3, in which said address selector includes means for providing the sign of the signal for each part of a signal period corresponding to a predetermined multiple of $M$.

6. A digital source as claimed in claim 2, in which the frequency $f$ of the signal is related to the sampling frequency $F$ by the relation $k=Nf/F$.

7. A digital source as claimed in claim 2, further including a memory and means for selecting from said memory one or more values of $k$, said sampling means including means for sampling the store at a rate or rates corresponding to the selected values of $k$ and thus to corresponding values of the signal frequency.

8. A digital source as claimed in claim 7, including an address counter for providing each selected value of $k$, register means for receiving the respective values read from the store for each value of $k$, and adding circuit means for aggregating the values held in said register means, said output circuit being connected to receive the output of said adding circuit means and to provide therefrom the output signal comprising one frequency for each selected value of $k$.

9. A digital source as claimed in claim 8, in which means for selecting comprises a keyboard, each key of which when depressed causes the generation of a corresponding frequency pair.

10. A digital source as claimed in claim 1, in which said store is a passive memory.

11. A digital source as claimed in claim 1, in which the store holds sine values in the interval $0-\pi/2$ radians, whereby the signal is sinusoidal.

12. A digital source as claimed in claim 1, in which the frequency $f$ of the signal is determined in relation to a value $k$ which is between zero and $N/2$, $N$ being the number of values in said store for defining the signal in each signal period.

13. A digital source as claimed in claim 12, in which the frequency $f$ of the signal is related to the sampling frequency $F$ by the relation $k=Nf/F$.

14. A digital source as claimed in claim 12, further including a memory and means for selecting from said memory one or more values of $k$, said sampling means including means for sampling the store at a rate or rates corresponding to the selected values of $k$ and thus to corresponding values of the signal frequency.

* * * * *